Patented Jan. 26, 1926.

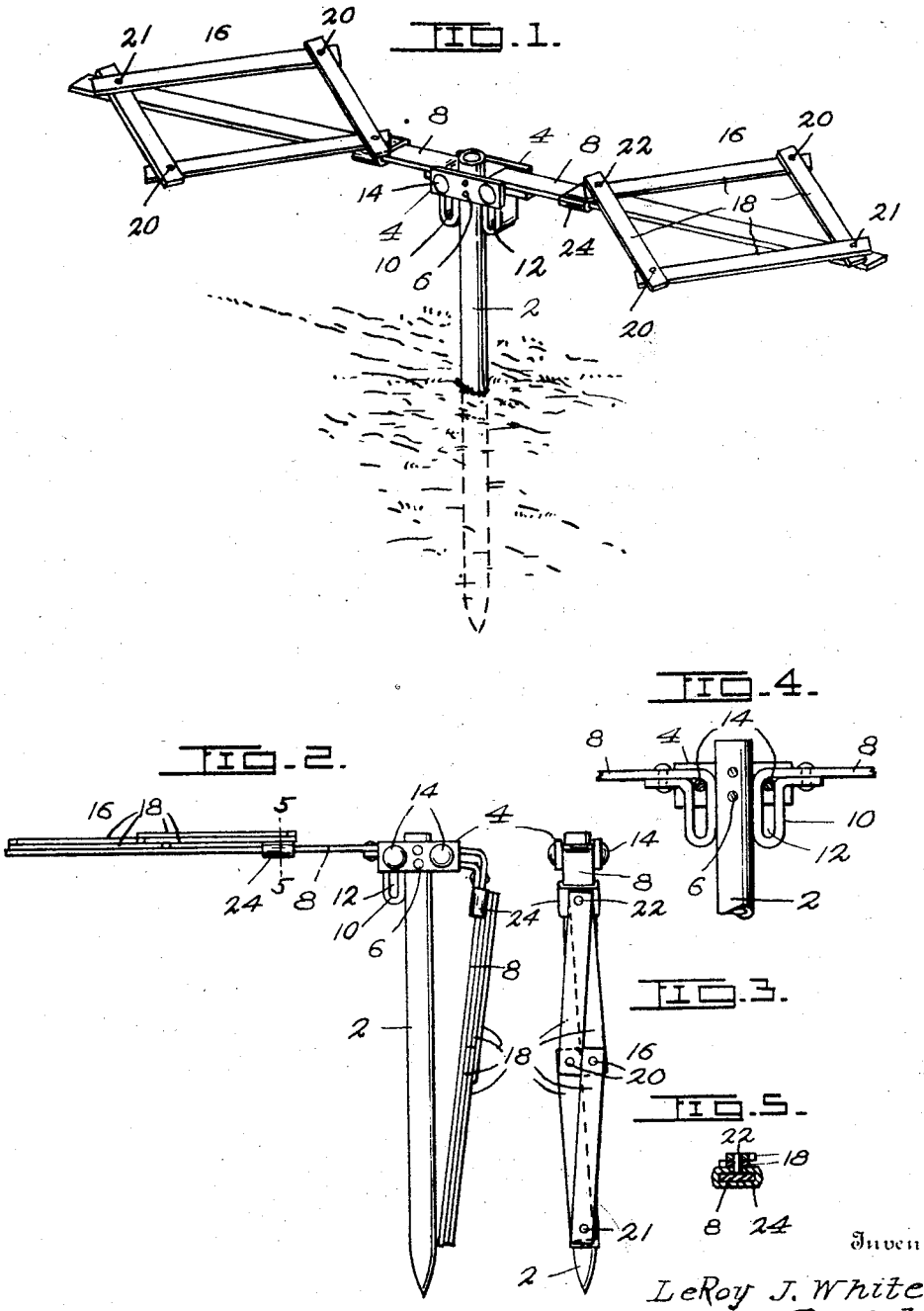

1,570,657

UNITED STATES PATENT OFFICE.

LE ROY J. WHITE AND OTTO C. TEUFEL, OF ELDON, IOWA.

CAMP GRATE.

Application filed July 21, 1925. Serial No. 45,037.

*To all whom it may concern:*

Be it known that we, LE ROY J. WHITE and OTTO C. TEUFEL, citizens of the United States, residing at Eldon, in the county of Wapello and State of Iowa, have invented certain new and useful Improvements in Camp Grates, of which the following is a specification.

Our invention relates to camp fire grates and one object is to provide a device of this character for the convenience of tourists, campers, picnickers, and others desiring to cook food out of doors.

A further object is to provide a simple and inexpensive device of this character which can be readily set up for the purpose of supporting cooking utensils over a camp fire, and when not in use may be folded into compact form for storage or transportation.

In order that the invention may be fully understood, reference will now be had to the accompanying drawing, in which:

Fig. 1 is a perspective view of the device set up ready for use.

Fig. 2 is a side elevation of the device with one of the shelves folded to inactive position.

Fig. 3 is a view similar to Fig. 2, but turned at right angles thereto.

Fig. 4 is a fragmentary elevation of the stake and two brackets foldably connected thereto.

Fig. 5 is a cross section on line 5—5 of Fig. 2.

In carrying out the invention we employ a main support in the form of a stake 2, which is pointed at its lower terminal so that it may be driven into the ground to support the device in operative position as shown by Fig. 1.

The stake 2 is provided at its upper end with a pair of diametrically opposed transverse members 4 firmly secured in place by suitable means such as rivets 6.

8 designates a pair of brackets which are formed into right angular loops 10 at their adjacent ends. The loops 10 provide slots 12 which enable the brackets 8 to be adjusted to the active position shown by Figs. 1 and 4, or to the inactive position shown at the left on Fig. 2, upon pivots 14 uniting the ends of the transverse members 4.

16 designates a foldable shelf mounted upon each bracket 8. Each shelf 16 consists of four bars 18 arranged in diamond shape and foldably connected by pivots 20, 21 and 22. The pivot 21, in addition to uniting the adjacent ends of the two bars 18, also extends through the associate bracket 8 to which it is fixedly mounted. The pivot 22 extends downwardly and is fixed to a sleeve 24 slidably mounted upon the associate bracket 8.

In practice the device is set up by driving the stake 2 into the ground a sufficient distance to enable it to reliably support the associate parts, together with the cooking utensils and their contents. The brackets 8 are then swung to a horizontal position in which they are reliably held by the pivots 14, extending through the upper portions of the slots 12, and the adjacent sides of the loops 10 bearing against the adjacent surfaces of the stake 2 as shown more clearly by Fig. 4. The shelves 16 are adjusted to the position disclosed by Fig. 1 for the purpose of supporting cooking utensils, the contents of which are cooked by a fire built beneath said shelves 16.

When the device is to be folded for transportation or storage, the shelves 16 are slid towards the rivets 14 to reduce said shelves 16 to approximately the same width as the brackets 8, which are then folded alongside of the stake 2 by lifting them upwardly until the lower ends of the loops 10 engage the pivots 14 upon which they swing to allow the brackets 8 to fold against the stake 2 as shown at the right on Fig. 2.

From the foregoing description it is apparent that we have provided a device embodying the advantages above pointed out, and while we have shown and described the preferred construction, combination and arrangement of parts, we reserve the right to make such changes as properly fall within the spirit and scope of the invention as claimed.

Having thus described our invention, what we claim and desire to secure by Letters Patent, is:

1. A device of the character described consisting of a stake, a pair of transverse members fixed to the upper portion of said stake, pivots carried by said transverse members, a pair of brackets provided at their adjacent ends with loops extending at an angle thereto, a sleeve slidable upon each bracket, and a pair of foldable shelves each of which consists of bars pivotally connected at their ends, one pivot being secured to the associate sleeve and another pivot being secured to the associate bracket.

2. A device of the character described consisting of a stake, a bracket associated with said stake, a sleeve slidable on said bracket, and a foldable shelf consisting of bars pivotally connected at their ends, one of said pivots being secured to the sleeve and another pivot being fixed to the bracket.

In testimony whereof we affix our signatures.

LE ROY J. WHITE.
OTTO C. TEUFEL.